US009203465B2

(12) United States Patent
Bouvier Des Noes et al.

(10) Patent No.: US 9,203,465 B2
(45) Date of Patent: Dec. 1, 2015

(54) METHOD OF ACQUIRING A GPS SIGNAL BY ITERATIVE DECODING

(71) Applicant: COMMISSARIAT A L'ENERGIE ATOMIQUE ET AUX ENE ALT, Paris (FR)

(72) Inventors: Mathieu Bouvier Des Noes, Grenoble (FR); Valentin Savin, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 15 days.

(21) Appl. No.: 14/185,190

(22) Filed: Feb. 20, 2014

(65) Prior Publication Data

US 2014/0233610 A1    Aug. 21, 2014

(30) Foreign Application Priority Data

Feb. 20, 2013   (FR) ...................... 13 51423

(51) Int. Cl.
*H04B 1/7073* (2011.01)
*G01S 19/30* (2010.01)
*H04B 1/7183* (2011.01)
*H04B 1/7075* (2011.01)

(52) U.S. Cl.
CPC .............. *H04B 1/7073* (2013.01); *G01S 19/30* (2013.01); *H04B 1/7075* (2013.01); *H04B 1/7183* (2013.01); *H04B 2201/70715* (2013.01)

(58) Field of Classification Search
CPC .. H04B 1/7075; H04B 1/7183; H04B 1/7073; H04B 2201/70715
See application file for complete search history.

(56) References Cited

U.S. PATENT DOCUMENTS

| 8,873,605 | B2 * | 10/2014 | Bouvier des Noes | 375/144 |
| 2007/0147483 | A1 * | 6/2007 | Tang | 375/149 |
| 2008/0215269 | A1 * | 9/2008 | Chugg et al. | 702/67 |
| 2008/0224926 | A1 * | 9/2008 | Curry et al. | 342/357.12 |
| 2010/0310009 | A1 | 12/2010 | Lakkis | |

OTHER PUBLICATIONS

French Preliminary Search Report issued Nov. 22, 2013 in French Application 13 51423, filed on Feb. 20, 2013 (with English translation of category of cited documents).

(Continued)

*Primary Examiner* — Shuwang Liu
*Assistant Examiner* — Ross Varndell
(74) *Attorney, Agent, or Firm* — Oblon, McClelland, Maier & Neustadt, L.L.P.

(57) ABSTRACT

The invention relates to a method of acquiring a GPS signal, spread by a Gold sequence obtained as the sum of a first M-sequence and a second M-sequence, this second M-sequence being characteristic of a satellite among a plurality of satellites in the GPS system. The acquisition method comprises a sampling step starting from a given time (410), a multiplication step for the sequence of samples obtained with the first M-sequence (420) and an iterative decoding step for the decoded values (430) making it possible to estimate the content of the second shift register of the second M-sequence at said given time. If the content thus estimated is identical to the initial content of the second register for an identified satellite (443), the receiver is synchronized with this satellite at said given time (490).

13 Claims, 6 Drawing Sheets

(56) References Cited

OTHER PUBLICATIONS

Keith M. Chugg et al. "A New Approach to Rapid PN Code Acquisition Using Iterative Message Passing Techniques", IEEE Journal on Selected Areas in Communications, vol. 23, No. 5, 2005, 14 pages.

Liu Jingye et al. "GPS C/A code signal simulation based on MATLAB", 2011 International Conference on Instrumentation, Measurement, Computer, Communication and Control, 3 pages.

European Search Report issued May 6, 2014, in European Patent Application No. 14 15 5621 with English translation of category of cited documents.

Andreas Polydoros, et al., "A Unified approach to Serial Search Spread-Spectrum Code acquisition" PartI: A general theory & Part II: A Matched-Filter Receiver, IEEE Transactions on. Communications, vol. 32, No. 5, May 1984, pp. 542-549 and 550-560.

Fabio Principe, et al., "Rapid Acquisition of Gold Codes and Related Sequences Using Iterative Message Passing on Redundant Graphical Models" Proc. MILCOM '06, 2006, pp. 1-7.

Frank R. Kschischang, et al., "Factor Graphs and the Sum-Product Algorithm", IEEE Transactions on Information Theory, vol. 47, No. 2, Feb. 2001, pp. 498-519.

Valentin Savin, "Self-Corrected Min-Sum decoding of LDPC codes", Proc. of Int'l Symposium on Information Theory (ISIT 2008), Toronto, Jul. 2008, pp. 1-5.

\* cited by examiner

| Satellite ID number | GPS PRN signal number | Code phase selection $G_2$ | Code delay chips | First 10 chips octal |
|---|---|---|---|---|
| 1 | 1 | 2 ⊕ 6 | 5 | 1440 |
| 2 | 2 | 3 ⊕ 7 | 6 | 1620 |
| 3 | 3 | 4 ⊕ 8 | 7 | 1710 |
| 4 | 4 | 5 ⊕ 9 | 8 | 1744 |
| 5 | 5 | 1 ⊕ 9 | 17 | 1133 |
| 6 | 6 | 2 ⊕ 10 | 18 | 1455 |
| 7 | 7 | 1 ⊕ 8 | 139 | 1131 |
| 8 | 8 | 2 ⊕ 9 | 140 | 1454 |
| 9 | 9 | 3 ⊕ 10 | 141 | 1626 |
| 10 | 10 | 2 ⊕ 3 | 251 | 1504 |
| 11 | 11 | 3 ⊕ 4 | 252 | 1642 |
| 12 | 12 | 5 ⊕ 6 | 254 | 1750 |
| 13 | 13 | 6 ⊕ 7 | 255 | 1764 |
| 14 | 14 | 7 ⊕ 8 | 256 | 1772 |
| 15 | 15 | 8 ⊕ 9 | 257 | 1775 |
| 16 | 16 | 9 ⊕ 10 | 258 | 1776 |
| 17 | 17 | 1 ⊕ 4 | 469 | 1156 |
| 18 | 18 | 2 ⊕ 5 | 470 | 1467 |
| 19 | 19 | 3 ⊕ 6 | 471 | 1633 |
| 20 | 20 | 4 ⊕ 7 | 472 | 1715 |
| 21 | 21 | 5 ⊕ 8 | 473 | 1746 |
| 22 | 22 | 6 ⊕ 9 | 474 | 1763 |
| 23 | 23 | 1 ⊕ 3 | 509 | 1063 |
| 24 | 24 | 4 ⊕ 6 | 512 | 1706 |
| 25 | 25 | 5 ⊕ 7 | 513 | 1743 |
| 26 | 26 | 6 ⊕ 8 | 514 | 1761 |
| 27 | 27 | 7 ⊕ 9 | 515 | 1770 |
| 28 | 28 | 8 ⊕ 10 | 516 | 1774 |
| 29 | 29 | 1 ⊕ 6 | 859 | 1127 |
| 30 | 30 | 2 ⊕ 7 | 860 | 1453 |
| 31 | 31 | 3 ⊕ 8 | 861 | 1625 |
| 32 | 32 | 4 ⊕ 9 | 862 | 1712 |
| — | 33 | 5 ⊕ 10 | 863 | 1745 |
| — | 34 | 4 ⊕ 10 | 950 | 1713 |
| — | 35 | 1 ⊕ 7 | 947 | 1134 |
| — | 36 | 2 ⊕ 8 | 948 | 1456 |
| — | 37 | 4 ⊕ 10 | 950 | 1713 |

METHOD OF ACQUIRING A GPS SIGNAL BY ITERATIVE DECODING

CROSS-REFERENCE TO RELATED APPLICATIONS

The present application claims priority to French Application No. 13 51423 which has a filing date of Feb. 20, 2013.

TECHNICAL FIELD

This invention relates in general to the field of satellite positioning systems such as the GPS (Global Positioning System) system and the Galileo system. It is more particularly applicable to the satellite signal acquisition phase using a GPS receiver.

DESCRIPTION OF RELATED ART

Conventionally, a GPS receiver determines its position by measuring the time-of-flight of signals received from a plurality of satellites (in principle at least four). The receiver uses a so-called C/A (Coarse Acquisition) channel on which the satellite emits a spectrally spread navigation message using a pseudo random sequence (called the spreading sequence) with good auto-correlation and inter-correlation properties (using PRN sequences used by other satellites), to estimate the time-of-flight of a GPS signal emitted by a satellite.

The good self-correlation properties of spreading sequences optimise the probability of detecting a signal in the presence of noise, while the good inter-correlation properties of these sequences enable the different satellites to share a single transmission band using a code distribution multiple access (CDMA).

The first task of a GPS receiver is to detect visible satellites. To achieve this, the receiver attempts to detect the spreading code of the satellite for which it wants to test the presence, and possibly to synchronise itself relative to this signal. This first task is called the GPS signal acquisition step.

Many methods of acquisition of the GPS signal are known in the state of art, they form part of the problem of multi-user detection in CDMA systems. In particular, the articles by A. Polydoros et al. entitled "A unified approach to serial search spread spectrum code acquisition" Part I: A general theory & Part II: a matched filter receiver, published in IEEE Trans. on. Comm., Vol. 32, No. 5, 1984 and the article by F. Principe et al. entitled "Rapid acquisition of Gold codes and related sequences using iterative message passing on redundant graphical models" published in Proc. MILCOM '06, 2006.

These acquisition methods are usually based on a correlation of the signal received by the receiver with the spreading code of the satellite to be tested.

However, the acquisition method described in the article by F. Principe mentioned above cannot provide a sufficiently low missed detection probability and false alarm probability at a low signal-to-noise ratio (SNR). The missed detection probability is the probability of not synchronising with a satellite spread sequence when the spread sequence is actually received by the receiver. The false alarm probability is the probability of synchronising with a spreading sequence that is not received by the receiver. At low signal-to-noise ratios, the false alarm probability is the probability of detecting a spread sequence in noise.

Furthermore, acquisition methods by correlation require that the different possible spreading codes should be tested one by one, which requires a long acquisition time in a series configuration, and high complexity in a parallel configuration.

The article by K. M. Chugg entitled "A new approach to rapid PN code acquisition using iterative message passing techniques" published in IEEE Journal on Selected Areas in Communications, Vol. 21, No. 5, May 2005, pp. 884-897 describes a method of acquiring a spread signal by means of a maximum length sequence using an iterative message passing decoding technique.

The purpose of this invention is to disclose a method of acquiring a satellite signal, particularly a GPS signal, capable of detecting a spreading sequence with a low missed detection probability, even at a low signal-to-noise ratio.

One other purpose of this invention is to disclose a method of acquiring a satellite signal with a low false alarm probability, even at a low signal-to-noise ratio.

Another purpose of this invention is to disclose a method of acquiring a satellite signal with a better compromise between acquisition time and complexity than in prior art.

BRIEF SUMMARY

This invention is defined by a method of acquiring a satellite signal by a receiver, said signal being spread by a Gold sequence at a chip frequency, said Gold sequence being obtained as the sum of a first M-sequence generated using a first shift register and a second M-sequence generated using a second shift register, said second M-sequence identifying one satellite among a plurality of satellites, said method comprising the following steps:

(a) the signal received in base band is sampled at the chip frequency starting from a determined time to provide a sequence of first samples;

(b) the sequence of said first samples is multiplied chip by chip by said first M-sequence to provide a sequence of second samples;

(c) the sequence of second samples is decoded using an iterative message passing decoding to supply an estimate of the content of the second shift register at said determined time;

(d) the content of the second shift register thus estimated is compared with a plurality of possible contents of the second shift register for the different satellites of said plurality, and if the comparison is successful for an identified satellite, the receiver is synchronised with said identified satellite at the determined time.

If the content of the second shift register thus estimated does not correspond to any of said possible contents, the determined time is incremented by one chip and steps (a) to (d) are iterated.

According to a first embodiment, the content of the second shift register is advantageously estimated by making hard decisions about the first r decoded value supplied by iterative message passing decoding, where r is the number of positions in the first/second shift register.

Iterative message passing decoding in step (c) preferably uses the parity matrix:

$$H = \begin{bmatrix} g_r & \cdots & g_0 & 0 & \cdots & \cdots & 0 \\ 0 & g_r & \cdots & g_0 & 0 & \cdots & 0 \\ \vdots & \ddots & \ddots & \ddots & \ddots & \ddots & \vdots \\ 0 & \cdots & 0 & g_r & \cdots & g_0 & 0 \\ 0 & \cdots & \cdots & 0 & g_r & \cdots & g_0 \end{bmatrix}$$

in which $g_r=1$ and $g_0, \ldots, g_{r-1}$ are the coefficients of the polynomial generating the second M-sequence.

The second M-sequence is advantageously obtained by summating the contents in two positions $\alpha_i, \beta_i$ of the second shift register, where i is an index identifying the satellite among said plurality of satellites, the possible contents of the second shift register for the different satellites being given by vectors:

$$A_i^{init} = (G_y^{\alpha_i} + G_y^{\beta_i}) A_y^{init}$$

where $A_y^{init}$ is a vector giving the content of the second shift register at a reference time, and $G_y$ is the state change matrix of the second shift register.

According to a second embodiment, the sequence of second samples is permuted using a permutation relation $\phi(k) = dk+h \mod(N)$ where k is the rank of the sample, d is a decimation factor, h is an offset value and N is the length of the first M-sequence, switching being done before step (c);

step (c) provides a sequence of decoded values;

the sequence of decoded values is permuted using the permutation relation inverse to said permutation relation to provide a sequence of switched values;

the content of the second shift register is estimated by taking hard decisions on the first r values of the sequence of permuted values, where r is the number of positions in the first/second shift register.

Advantageously, the iterative message passing decoding in step (c) uses the parity matrix:

$$H = \begin{bmatrix} g_r & \cdots & g_0 & 0 & \cdots & \cdots & 0 \\ 0 & g_r & \cdots & g_0 & 0 & \cdots & 0 \\ \vdots & \ddots & \ddots & \ddots & \ddots & \ddots & \vdots \\ 0 & \cdots & 0 & g_r & \cdots & g_0 & 0 \\ 0 & \cdots & \cdots & 0 & g_r & \cdots & g_0 \end{bmatrix}$$

in which $g_r=1$ and $g_0, \ldots, g_{r-1}$ are the coefficients of the polynomial generating the first M-sequence.

In one variant of the first and second embodiments, it is checked that the receiver is properly synchronised with said identified satellite by:

(e) multiplying the sequence of said first samples, chip by chip, by the second M-sequence associated with said identified satellite to provide a sequence of third samples;

(f) decoding the sequence of third samples using an iterative message passing decoding to provide an estimate of the content of the first shift register at said determined time.

If the content of the first shift register thus estimated does not correspond to the initial content of the first register, the determined time is incremented by one chip and steps (a) to (f) are iterated.

Preferably, the content of the first shift register is estimated by taking hard decisions on the first r decoded values provided by the iterative message passing decoding, where r is the number of positions in the first/second shift register.

Advantageously, the iterative message passing decoding in step (f) uses the parity matrix $$H = \begin{bmatrix} g_r & \cdots & g_0 & 0 & \cdots & \cdots & 0 \\ 0 & g_r & \cdots & g_0 & 0 & \cdots & 0 \\ \vdots & \ddots & \ddots & \ddots & \ddots & \ddots & \vdots \\ 0 & \cdots & 0 & g_r & \cdots & g_0 & 0 \\ 0 & \cdots & \cdots & 0 & g_r & \cdots & g_0 \end{bmatrix}$$

in which $g_r=1$ and $g_0, \ldots, g_{r-1}$ are the coefficients of the polynomial generating the first M-sequence.

According to one advantageous embodiment, the iterative message passing decoding in step (c) and the iterative message passing decoding in step (f) both use a "Min-Sum" type algorithm.

BRIEF DESCRIPTION OF THE DRAWINGS

Other features and advantages of the invention will become clear after reading the preferred embodiments of the invention with reference to the appended figures among which.

DETAILED PRESENTATION OF PARTICULAR EMBODIMENTS

We will start by summarising how the C/A coarse synchronisation signal is emitted by a satellite in a positioning system such as the GPS system or the Galileo system.

The signal emitted by a satellite on the C/A channel can be expressed in the form:

$$x_i(k) = d\left(\left\lfloor \frac{k}{LN} \right\rfloor\right) c_i(k) \tag{1}$$

where $i=1, \ldots, 32$ is the index of the satellite, $d(l)$ is the $l^{th}$ BPSK symbol in the navigation message, k is a time index, $c_i(k)$ is the $k^{th}$ chip of the spread code associated with the satellite i, N is the length of the spread code (in practice N=1023 for the GPS system) and L is the number of BPSK symbols in the navigation message. For the GPS system, each $d(l)$ symbol lasts for 20 ms, namely 20 repetition periods of the spreading code, the chip frequency (or chip rate) being 1.023 MHz.

The satellite signal received by the receiver on the C/A channel can then be written as follows, in base band:

$$r(k) = \sum_{i=1}^{I} \rho_i x_i(k) e^{2\pi j(k\Delta F_i T + \theta_i)} + w(k) \quad (2)$$

where I is the maximum number of satellites (I=32 in the GPS system), $\rho_i$ is the attenuation coefficient of the signal on the link between the satellite i and the receiver, assumed to be constant during the time of the message, $\Delta F_i$ is the shift of the carrier frequency (mainly due to the Doppler shift) and $\theta_i$ is the phase of the signal from the satellite i (assumed to be constant), and finally w(k) is a noise sample assumed to be additive white Gaussian noise (AWGN) with variance $\sigma^2$.

The spreading sequences $c_i$ of the different satellites i=1, . . . , I are Gold sequences, each Gold sequence being constructed from a sum of two maximum length sequences also called M-sequences. It will be remembered that an M-sequence is a periodic series of values produced by a linear feedback shift register (LFSR) that explores all values that can be produced by the shift register. Any linear combination of two M-sequences with the same degree r (in other words generated by generating polynomials with the same degree) does not necessarily give a Gold sequence; a pair of M-sequences for which the sum gives a Gold sequence is called a pair of preferred sequences.

Each spreading sequences $c_i$ in the C/A channel is constructed from a pair of preferred M-sequences, x and y. More precisely:

$$c_i(k)=x(k)+y(k-\tau_i) \quad (3)$$

where $\tau_i$ is a delay expressed as a number of chip periods specific to satellite i.

The x and y M-sequences are generated from the generating polynomials:

$$g_x(D)=D^{10}+D^3+1$$

$$g_y(D)=D^{10}+D^9+D^8+D^3+D^2+1 \quad (4)$$

respectively.

Figure 1:
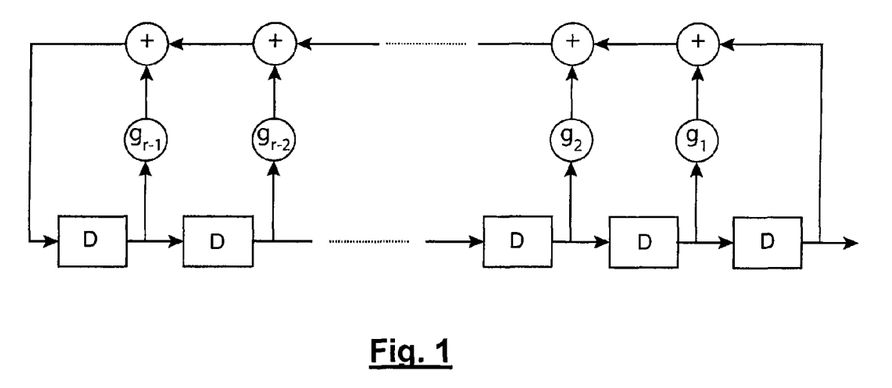
FIG. 1 diagrammatically shows a Fibonacci representation of a maximum sequence generator.

It will be remembered that an LFSR sequence generated by a generating polynomial $$g(D) = 1 + \sum_{p=1}^{r-1} g_p D^p$$

with degree r is obtained from a shift register with r memory positions (referred to more simply as positions in the following) and r connectors, looped back on itself as shown in FIG. 1, using the Fibonacci representation. The multiplication factors on the different connectors are factors of the generating polynomial.

An M-sequence is defined uniquely by its generating polynomial, the content of the shift register at the initial time giving its original value. An M-sequence generated by a generating polynomial (primitive) with degree r is periodic and its length is $N=2^r-1$.

The M-sequences x and y are generated by initialising the positions of their corresponding shift registers to 1, namely x(0)=x(1)= . . . =x(9)=1 and y(0)=y(1)= . . . =y(9)=1.

The delayed sequence $y_i$ defined by $y_i(k)=y(k-\tau_i)$ is advantageously obtained using the "add and shift" property of M-sequences. More precisely, the delays $\tau_i$ are chosen such that the sequence $y_i$ can be generated from the sum of the contents in two positions $\alpha_i$ and $\beta_i$ of the shift register generating the sequence y namely:

$$y_i(k)=a_{\alpha_i}(k)+a_{\beta_i}(k) \quad (5)$$

where $a_{\alpha_i}(k)$, $a_{\beta_i}(k)$ are the contents of the shift register at positions $\alpha_i$ and $\beta_i$ respectively at time k, in other words $a_{\alpha_i}(k)=y(k+\alpha_i)$ and $a_{\beta_i}(k)=y(k+\beta_i)$.

Figure 2:
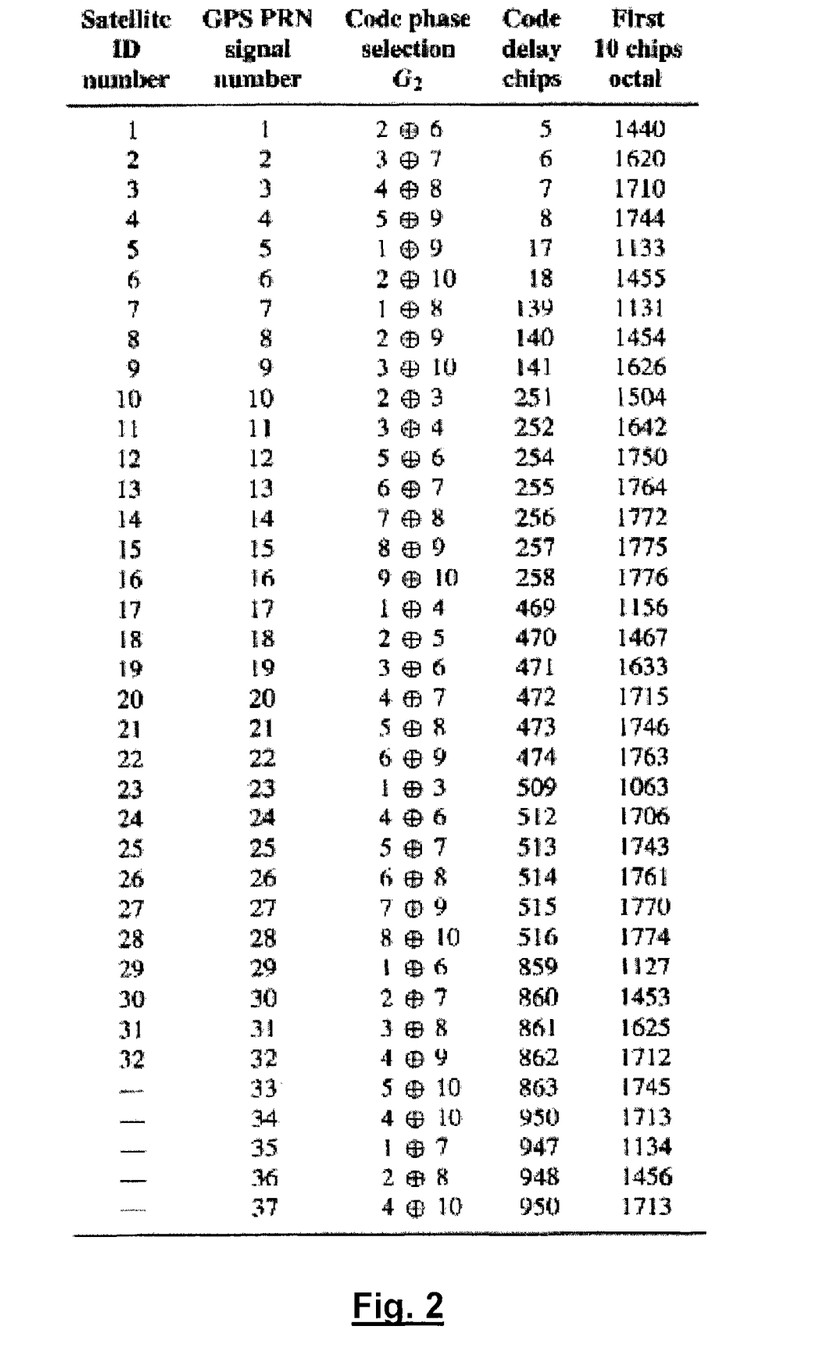
FIG. 2 gives C/A code parameters for different satellites.

FIG. 2 shows a table giving the parameters $\alpha_i$, $\beta_i$ and $\tau_i$ for the different satellites. More precisely, the column entitled "code phase selection" gives the positions $\alpha_i$, $\beta_i$ and the column entitled "code delay chips" gives the delay $\tau_i$. Finally, the last column provides the initialisation word, in other words the first 10 values of the sequence $y_i$ in octal representation.

Figure 3:
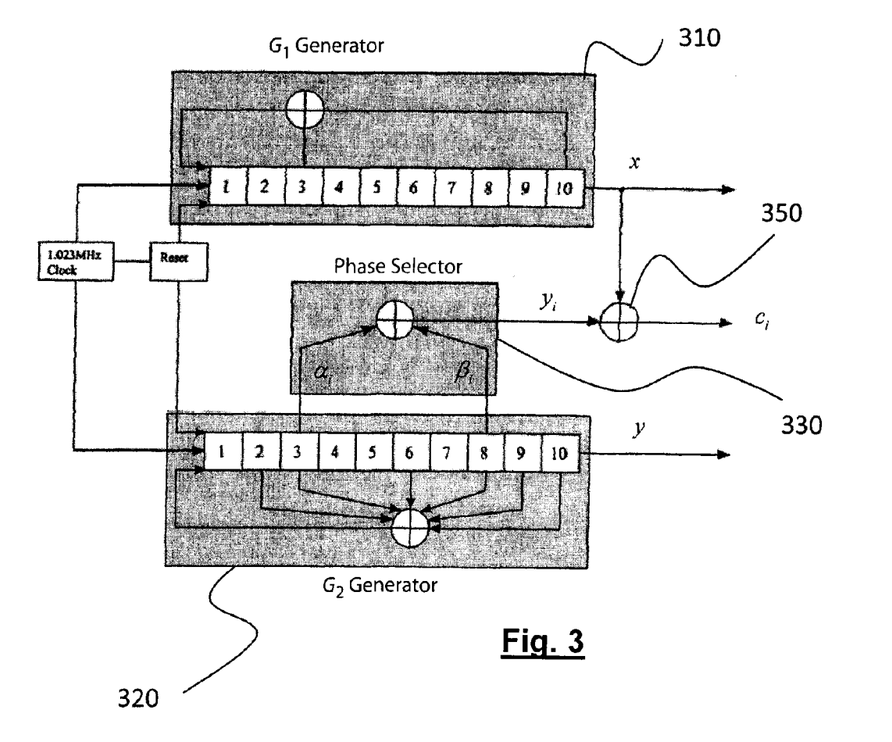
FIG. 3 diagrammatically shows a C/A code generator in a GPS system.

FIG. 3 diagrammatically shows a C/A code generator in a GPS system.

The generator 310 of the M-sequence x can be seen in the top part, and the generator 320 of the M-sequence y can be seen in the bottom part. The two generators 310 and 320 use shift registers looped back on themselves. For each generator, the connectors of the shift register correspond to the monomials of the corresponding generating polynomial. The phase selector 330 selectively summates some positions of the shift register of 320. These positions $\alpha_i$ and $\beta_i$ are chosen using the table in FIG. 2, the sum of the contents of the register at these two positions supplying the delay sequence $y_i$. This implementation is advantageous in that it does not require the use of a large delay line with length $\tau_i$.

The sum of M-sequences X and $y_i$ in 350 gives the Gold sequence $c_i$, in other words the spreading sequence for satellite i.

Figure 4:
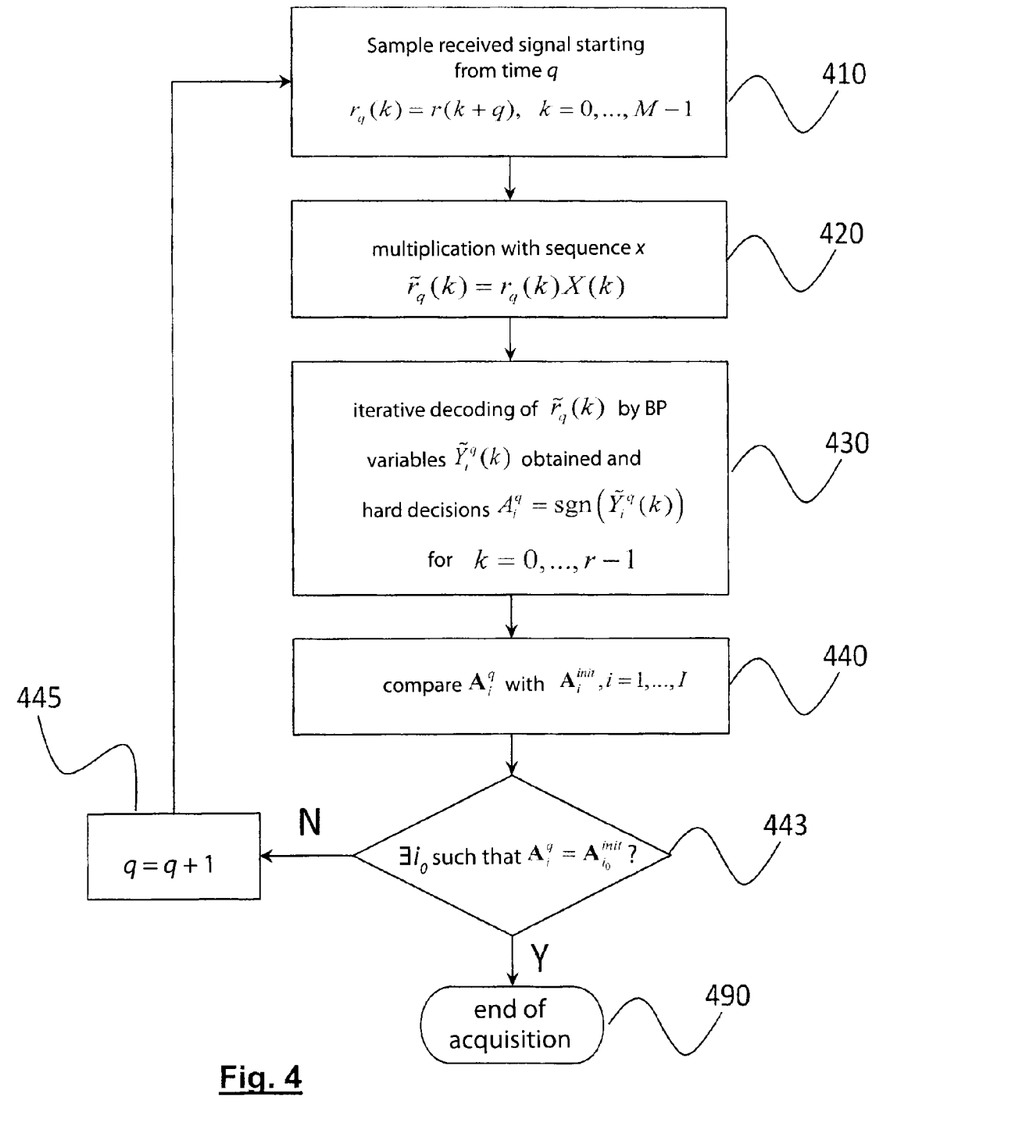
FIG. 4 diagrammatically shows a satellite signal acquisition method according to a first embodiment of the invention.

FIG. 4 diagrammatically shows a satellite signal acquisition method according to a first embodiment of the invention.

The first step is to consider synchronisation of the receiver relative to a GPS signal from a satellite i.

The receiver samples the received satellite signal at the chip frequency, after demodulation to base band.

At each time q, the receiver forms a vector in 410, composed of M successive signal samples thus received, namely $r_q(k)=r(k+q)$, k=0, . . . , M−1, where M=N+1 is the period of the M-sequence (M=1024 in the GPS system).

The receiver then tests whether or not it is well synchronised with M-sequence X. To achieve this, it assumes that it is synchronised with this sequence and makes a chip by chip multiplication of the received signal with M-sequence X, in step 420, namely:

$$\tilde{r}_q(k)=r_q(k)X(k) \quad (6)$$

where X(k)=1−2x(k) is the bipolar representation (BPSK) of M-sequence X.

This operation eliminates M-sequence x from the received signal:

$$\tilde{r}_q(k)=\rho_i Y_i(k)+\tilde{w}(k) \quad (7)$$

where $Y_i(k)=1-2\ y_i(k)$ is the bipolar representation of M-sequence $y_i$ and $\tilde{w}(k)$ contains all noise sources.

It is deduced from expression (7) that vector $\tilde{r}_q(k)$, k=0, . . . , M−1 is a noisy observation of M consecutive chips in sequence. $y_i$ An iterative message passing decoding is done in step 430 (also called a belief propagation decoding) of word $\tilde{r}_q(k)$ k=0, . . . , M−1. The operation that associates the content (at time q) of the shift register of an M-sequence generator with the M-sequence itself may be considered as being cyclic linear coding with efficiency r/2'−1 (the size of the register word is r while the size of the M-sequence is N=2'−1).

In general, if an M-sequence z defined by a generating polynomial $$g_z(D) = \sum_{p=0}^{r-1} g_p D^p$$

is considered, there is the parity constraint:

$$\sum_{p=0}^{r} g_{r-p} z(p+k) = 0 \quad (8)$$

in which $g_r=1$ has been defined. The parity matrix of the code is the matrix with size $(M-r) \times M$:

$$H = \begin{bmatrix} g_r & \cdots & g_0 & 0 & \cdots & \cdots & 0 \\ 0 & g_r & \cdots & g_0 & 0 & \cdots & 0 \\ \vdots & \ddots & \ddots & \ddots & \ddots & \ddots & \vdots \\ 0 & \cdots & 0 & g_r & \cdots & g_0 & 0 \\ 0 & \cdots & \cdots & 0 & g_r & \cdots & g_0 \end{bmatrix} \quad (9)$$

Decoding is then done in the same way as for message passing decoding between variable nodes (variables $y_i(k)$) and constraint nodes (parity constraints given by the rows in the parity matrix H where the coefficients are the coefficients of the polynomial $g_y(D)$).

A description of the message passing decoding method has been given in the article by F. R. Kschichang et al. entitled "Factor graphs and the Sum-Product algorithm" published in IEEE Trans. on Information Theory, Vol. 47, No. 2, February 2001. A simpler but sub-optimal version of this algorithm was proposed by V. Savin in the article entitled "Self-corrected Min-Sum decoding of LDPC codes" published in Proc. of Intl Symposium on Information Theory (ISIT 2008), Toronto, July 2008.

Regardless of what version is used, decoding of the word $\tilde{r}_q(k)$, $k=0, \ldots, M-1$ (or only part of this word because it has very high redundancy) provides a vector $\hat{Y}_i^q(k)$, $k=0, \ldots, M-r-1$ (the index q has been added to emphasise that this vector was obtained assuming that the sequence was synchronised at time q), from which only the first r values giving the content of the register at the initial time q, as a result of hard decisions, are used. The values $\hat{Y}_i^q(k)$ are logarithmic likelihood ratios (LLR) and therefore the content of the shift register at time q is given as follows:

$$A_i^q(k) = \text{sgn}(\hat{Y}_i^q), k=0, \ldots, r-1 \quad (10)$$

where $\text{sgn}(\bullet)$ is the sign function associating the value +1 to all positive values and the value −1 to all negative values.

The vector $A_i^q(k)$, $k=0, \ldots, r-1$ is compared with the $I=32$ possible initialisation words of the shift register of sequence $y_i$, denoted $A_i^{init}$, $i=1, \ldots, I$, in step 440.

These initialisation words are deduced from the initialisation word $A_y^{init}=(1 \ldots 1)^T$ of the shift register of sequence y. It should be remembered that according to expression (5):

$$y_i(k) = y(k+\alpha_i) + y(k+\beta_i) \quad (11)$$

which can be translated into matrix form as:

$$A_i = (G_y^{\alpha_i} + G_y^{\beta_i}) A_y \quad (12)$$

where $A_i$ and $A_y$ are the word contained in the shift register of sequence $y_i$ and the word contained in the shift register of sequence y respectively, $G_y$ is the state transposition matrix, in other words the matrix relating content vectors of the shift register at successive times, namely:

$$A_y(k+1) = G_y A_y(k) \quad (13)$$

The state transposition matrix $G_y$ is given as follows:

$$G_y = \begin{bmatrix} 0 & 1 & 0 & 0 & \cdots & 0 \\ 0 & 0 & 1 & 0 & \cdots & 0 \\ 0 & 0 & 0 & 1 & \cdots & 0 \\ \vdots & \vdots & \vdots & 0 & \ddots & 0 \\ 0 & 0 & 0 & 0 & \cdots & 1 \\ 1 & g_{r-1}^y & g_{r-2}^y & g_{r-3}^y & \cdots & g_0^y \end{bmatrix} \quad (14)$$

where the coefficients $g_0^y, \ldots, g_{r-1}^y$ are the coefficients of the polynomial generating the sequence y. If the relation (12) is applied at the time of initialisation, we obtain particularly:

$$A_i^{init} = (G_y^{\alpha_i} + G_y^{\beta_i}) A_y^{init} \quad (15)$$

The vectors $A_i^{init}$ can then be calculated in advance to avoid slowing the acquisition.

If there is an index $i_0$ such that:

$$A_i^q = A_{i_0}^{init} \quad (16)$$

it will be considered that the receiver is synchronised with the GPS signal of satellite $i_0$ and the acquisition method terminates at 490. By default, the acquisition method continues by incrementing q in 445, in other words starting from the next sample and returning to step 410.

Figure 5:
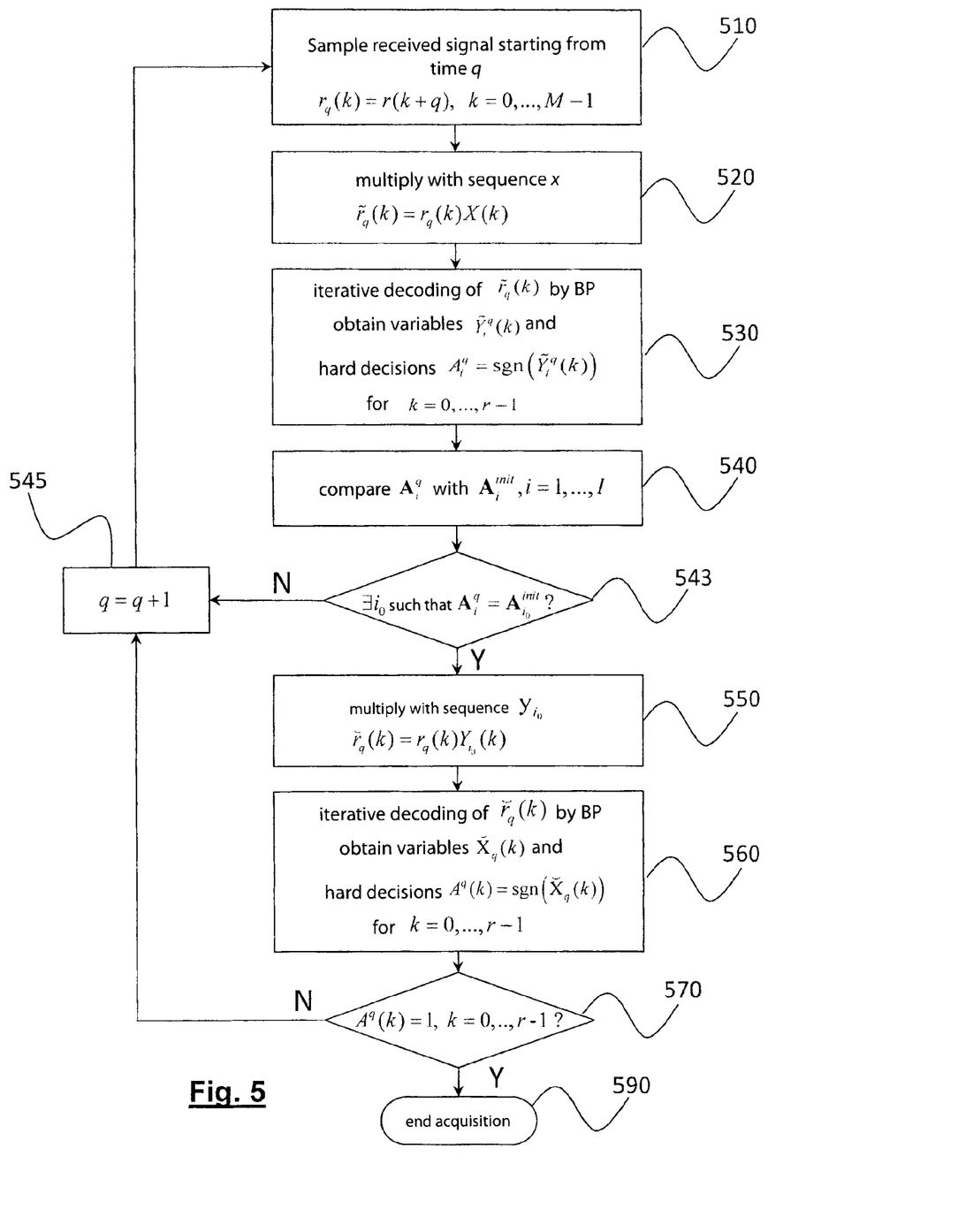
FIG. 5 diagrammatically shows a satellite signal acquisition method according to a variant of the first embodiment of the invention.

FIG. 5 diagrammatically shows a variant of the acquisition method in FIG. 4.

Steps 510 to 545 are identical to steps 420 to 445 and therefore they will not be described.

The variant in FIG. 5 is different from the variant in FIG. 4 in that once the receiver has determined the index $i_0$ of the satellite with which it considers it is synchronised, it performs a verification phase. This verification phase considerably reduces the false alarm probability. It is particularly advantageous when the message passing decoding method is implemented in its simplified "Min-Sum" version mentioned above.

This verification phase is based on the following principle: if the detected sequence $y_{i_0}$ is correct, then it can be used to find the M-sequence x starting from the received signal $r_q(k)$, $k=0, \ldots, M-1$.

More precisely, the received signal $r_q(k)=r(k+q)$, $k=0, \ldots, M-1$ is multiplied in step 550 with the $Y_{i_0}(k)=1-2y_{i_0}(k)$, $k=0, \ldots, M-1$ sequence, the bipolar representation of the M-sequence $y_{i_0}$. The sequence defined as follows is obtained:

$$\check{r}_q(k) = r_q(k) Y_{i_0}(k) \quad (17)$$

This operation eliminates sequence $y_{i_0}$ from the received signal if this sequence is present in it:

$$\check{r}_q(k) = X(k) + \check{w}(k) \quad (18)$$

where $X(k)=1-2x(k)$, $k=0, \ldots, M-1$ is the bipolar representation of M-sequence and $\check{w}(k)$ contains all noise sources.

It will be understood that step 550 is "symmetric" to step 520.

Since the vector $\check{r}_q(k)$, $k=0, \ldots, M-1$ is a noisy observation of M consecutive chips of M-sequence X, iterative decoding is done in step 560 using a message passing algorithm of the "Sum-Product" or "Min-Sum" type. For example, if a Min-Sum algorithm was used for decoding $\tilde{r}_q(k)$, $k=0, \ldots, M-1$ in step 530, the algorithm type will advantageously be used to decode ř$_q$(k), k=0, . . . , M−1. The constraints are given by the rows in the matrix H in which the coefficients are those of the generating polynomial g$_x$(D).

Regardless of the type of algorithm, decoding of the word ř$_q$(k), k=0, . . . , M−1 (or only part of this word because it has very high redundancy) provides a vector X̌$_q$(k), k=0, . . . , M−r−1 (the index q was added to emphasise that this vector was obtained assuming that the sequence was synchronised at time q) from which only the first r values giving the content of the register at the initial time q by means of hard decisions, are used. The values X̌$_q$(k) are logarithmic likelihood ratios (LLR) and therefore the content of the shift register at time q is given as follows:

$$A^q(k)=\text{sgn}(\check{X}_q(k)), k=0,\ldots,r-1 \quad (19)$$

In step 570, it is verified if the vector A$^q$ is equal to the initialisation vector of M-sequence x, in other words if A$^q$(k)=1, k=0, . . . , r−1.

If this is the case, in other words if the verification is positive, it is concluded that the receiver is well synchronised with the GPS signal from satellite i$_0$. The acquisition method then terminates at 590.

On the other hand, if this is not the case, synchronisation with the GPS signal from satellite i$_0$ is invalidated. The acquisition method continues by incrementing q at 575, in other words from the next sample and returning to step 510.

The false alarm probability for this variant is equal to $P_{fa}^2$ where $P_{fa}$ is the false alarm probability obtained with the acquisition method (without verification) in FIG. 4. Thus for example, if the false alarm probability without verification is 10$^{-3}$, then the false alarm probability with verification will be of the order of 10$^{-6}$.

Figure 6:
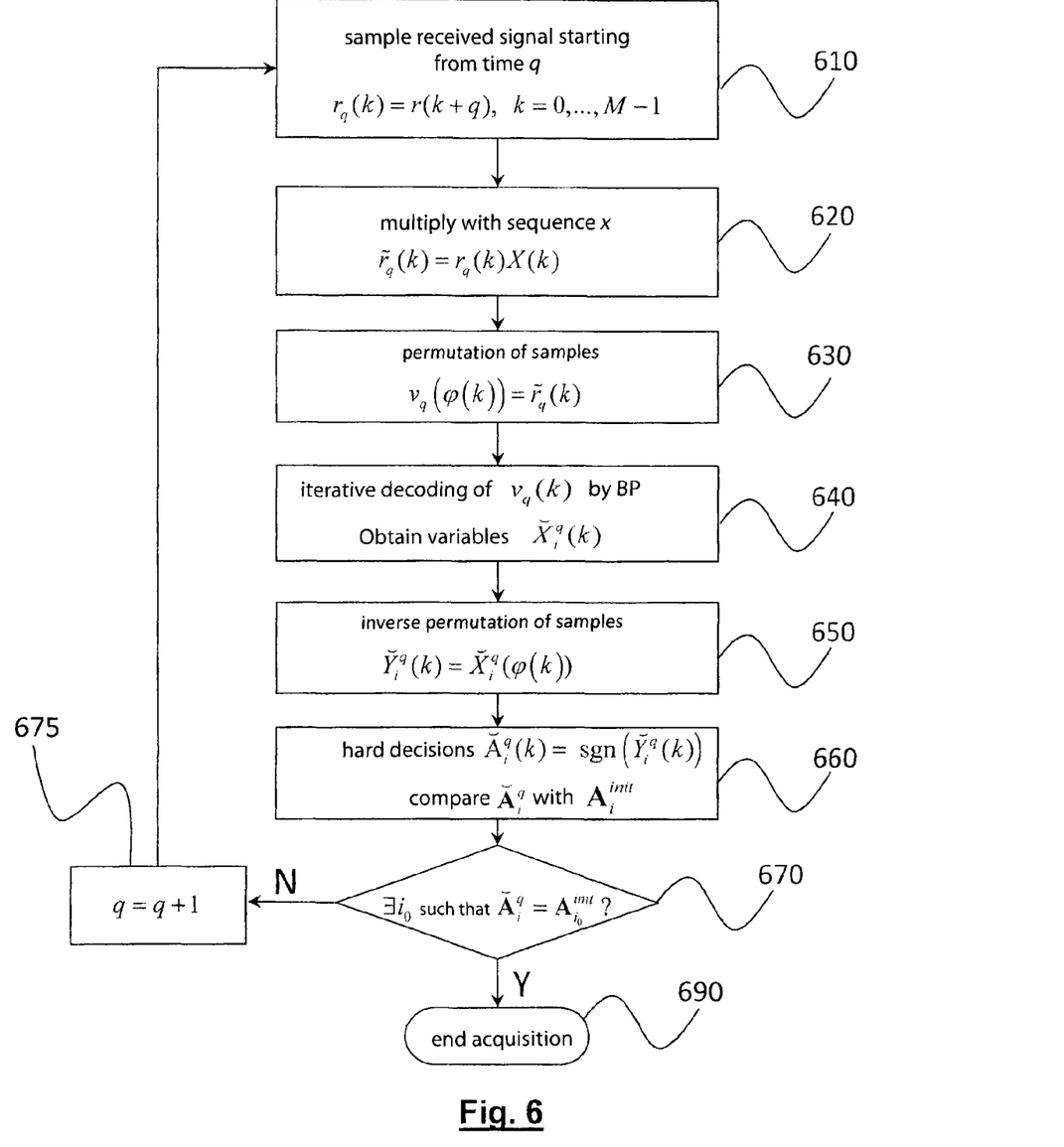
FIG. 6 diagrammatically shows a satellite signal acquisition method according to a second embodiment of the invention.

FIG. 6 diagrammatically shows a GPS signal acquiring method according to a second embodiment of the invention.

This embodiment takes advantage of the fact that two M-sequences on the same Galois body GF(2$^r$) are related by a decimation relation. Thus, if u and v are two M-sequences generated by primitive polynomials with degree r, we obtain:

$$u(k)=v(dk+h) \quad (20)$$

where d is a decimation factor and h is a constant dependent on the initial content of the registers of M-sequences u and v.

For a preferred pair of sequences x, y, the decimation factor will be equal to d=2$^e$+1 with the condition gcd(2$^e$+1, 2$^r$−1)=1.

For generating polynomials g$_x$ and g$_y$ given in (4), r=10, it can then be demonstrated that e=6 and hence d=65 and considering the register initialisation words for sequences x, y:

$$y(k)=x(65k+27300) \quad (21)$$

If we define a sequence x$_i$ by x$_i$(k)=x(k−65τ$_i$), we obtain:

$$y_i(k)=x_i(65k+27300) \quad (22)$$

The relation between sequence y$_i$ and sequence x$_i$ is independent of the index i, in other words it remains valid regardless of which satellite is used.

Once again, we will start by considering the synchronisation of the receiver relative to a satellite signal.

The receiver samples the received signal at the chip frequency after demodulation in base band and forms the vector r$_q$(k)=r(k+q) k=0, . . . , M−1 at each time q in 610, composed of M successive samples of the received signal.

A chip by chip multiplication of the received signal is made in step 620 with M-sequence x to obtain the reprocessed samples r̃$_q$(k), k=0, . . . , M−1 as defined in relation (6).

The M reprocessed samples are switched in step 630 using the following switching relation:

$$\phi(k)=dk+h \bmod(N) \quad (23)$$

In other words for the generating polynomials g$_x$ and g$_y$ given in (4):

$$\phi(k)=65k+27300 \bmod(1023) \quad (23')$$

The sequence v$_q$ obtained by switching these samples is formed:

$$v_q(\phi(k))=\tilde{r}_q(k), k=0,\ldots,M-1 \quad (24)$$

It will be noted that this switching is independent of which satellite i is being considered.

According to one variant not shown, LM rather than M samples r$_q$(k) are obtained in 610, and after chip by chip multiplication in 620, the sequence v$_q$ is obtained by coherent summation on L blocks using sequence x (it will be remembered that this sequence is repeated at intervals M):

$$v_q(\varphi(k)) = \sum_{\ell=0}^{L-1} \tilde{r}_q(k+\ell M), k=0,\ldots,M-1 \quad (24')$$

In all cases, iterative message passing decoding of word v$_q$(k), k=0, . . . , M−1 is then performed in step 640. This word actually represents a noisy observation of the x$_i$(k), k=0, . . . , M−1 sequence. Iterative decoding is done using the parity matrix H (according to expression (9)), in which the coefficients g$_0$, . . . , g$_r$ are the coefficients of the polynomial g$_x$(D)).

A sequence of logarithmic likelihood ratios (LLRs) denoted X̌$_i^q$(k), k=0, . . . , M−1 is obtained at the end of iterative decoding.

Inverse switching of the samples X̌$_i^q$(k), k=0, . . . , M−1, is done in step 650 to obtain the logarithmic likelihood ratios:

$$\check{Y}_i^q(k)=\check{X}_i^q(\phi(k)) \quad (25)$$

The content of the shift register of sequence y$_i$ at time q, is obtained in step 660, namely:

$$\check{A}_i^q(k)=\text{sgn}(\check{Y}_i^q(k)), k=0,\ldots,r-1 \quad (26)$$

and the vector Ǎ$_i^q$ of components Ǎ$_i^q$(k), k=0, . . . , r−1, is compared with the initialisation vectors of the different sequences y$_i$, i=1, . . . , I, in other words with the vectors A$_i^{init}$ previously calculated using the expression (15).

If there is an index i$_0$ in 670 such that:

$$\check{A}_i^q = A_{i_0}^{init} \quad (27)$$

it is considered that the receiver is synchronised with the GPS signal from satellite i$_0$ and the acquisition method terminates in 690. Otherwise, the acquisition method continues by incrementing q at 675, in other words starting from the next sample and returning to step 610.

Figure 7:
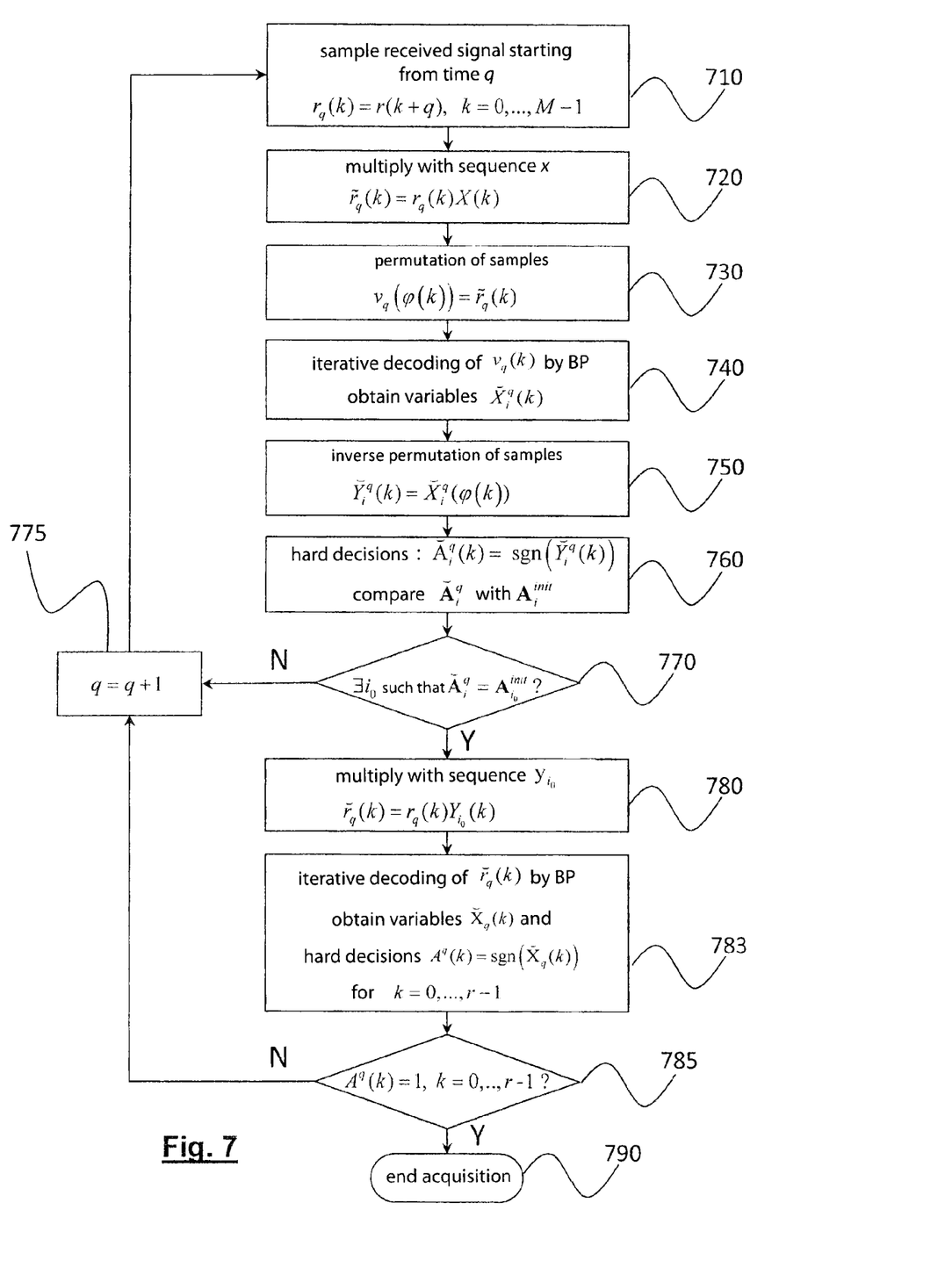
FIG. 7 diagrammatically shows a satellite signal acquisition method according to a variant of the second embodiment of the invention.

This second embodiment can also be broken down according to a variant shown in FIG. 7, in which a verification of synchronisation with satellite i$_0$ is made.

As already mentioned in the description of the first embodiment, this verification phase very much reduces the false alarm probability and is particularly advantageous when iterative decoding of v$_q$(k), k=0, . . . , M−1 is done according to the "Min-Sum" algorithm.

Steps 710 to 775 are identical to steps 610 to 675 and therefore they will not be described here. Only the verification phase will be described:

In step 780, the received signal r$_q$(k)=r(k+q), k=0, . . . , M−1 is multiplied by the sequence Y$_{i_0}$(k)=1−2y$_{i_0}$(k), k=0, . . . , M−1, the bipolar representation of M-sequence y$_{i_0}$. This multiplication eliminates M-sequence $y_{i_0}$ from the received signal. The sequence $\check{r}_q$ defined by expression (17) is obtained.

Iterative decoding is done in step 783 using a message passing algorithm of the "Sum-Product" or "Min-Sum type. For example, if a Min-Sum algorithm was used for decoding of $v_q(k)$, k=0, ..., M−1 in step 740, the algorithm type will advantageously be used for decoding of $\check{r}_q(k)$, k=0, ..., M−1. The constraints are given by the rows in the matrix H in which the coefficients in this case are the coefficients of the generating polynomial $g_x(D)$.

Whatever algorithm type is used, decoding provides a vector $\check{X}_q(k)$ k=0, ..., M−1, from which only the first r components giving the content of the register at the initial time q by means of hard decisions, are used. Let $A^q$ be the vector composed of the first r components in question.

In step 785, it will be verified if the vector $A^q$ is equal to the initialisation vector of M-sequence x, in other words if $A^q(k)=1$, k=0, ..., r−1.

If it is, in other words if the verification is positive, it will be concluded that the receiver is well synchronised with the GPS signal from satellite $i_0$. The acquisition method then terminates at 790.

On the other hand if this is not the case, synchronisation with the GPS signal from satellite $i_0$ is invalidated. The acquisition method continues by incrementing q at 787, in other words starting from the next sample, and returning to step 710.

In previous embodiments, the receiver determines if it is synchronised with the GPS signal of the C/A channel for a given satellite $i_0$ at a given time. In practice, the C/A channel comprises signals from a plurality of satellites with index $i_0, \ldots, i_{Q-1}$ where Q is the number of satellites visible to the receiver. The acquisition method presented above determines the satellite $i_0$ with the highest signal-to-noise ratio at the receiver. Once this first signal has been acquired, the signal received from satellite $i_0$, can be determined in base band:

$$\hat{r}_{i_0}(k) = (\hat{\rho}_{i_0} e^{2\pi j \hat{\theta}_{i_0}}) x_{i_0}(k) e^{2\pi j k \hat{\Delta F}_{i_0} T} \quad (28)$$

that can then be subtracted from the received signal in base band (expression (2)).

$$\hat{\rho}_{i_0} e^{2\pi j \hat{\theta}_{i_0}}$$

is an estimate of the complex attenuation coefficient on the channel between the satellite and the receiver (for example obtained by means of pilot symbols) and $\hat{\Delta F}_v$ is the offset frequency estimated by the receiver. $x_{i_0}(k)$ is a known synchronisation message of the receiver.

The acquisition of the second satellite can then be continued starting from signal $r(k)-\hat{r}_{i_0}(k)$ and so on, using a SIC (Serial Interference Cancellation) scheme known per se.

The invention claimed is:

1. A method of acquiring a satellite signal by a receiver, said satellite signal being spread by a Gold sequence ($c_i$) at a chip frequency, said Gold sequence being obtained as the sum of a first M-sequence (x) generated using a first shift register and a second M-sequence ($y_i$) generated using a second shift register, said second M-sequence identifying one satellite among a plurality of satellites, the method comprising:

(a) sampling the satellite signal received in base band at the chip frequency starting from a determined time (q) to provide a sequence of first samples ($r_q(k)$, k=0, ..., M−1);

(b) multiplying the sequence of said first samples ($r_q(k)$, k=0, ..., M−1), chip by chip, by said first M-sequence (x) to provide a sequence of second samples ($\tilde{r}_q(k)$, k=0, ..., M−1);

(c) decoding the sequence of second samples ($\tilde{r}_q(k)$, k=0, ..., M−1) using an iterative message passing decoding to supply an estimate of a content of the second shift register at said determined time (q);

(d) comparing the estimated content of the second shift register with a plurality of possible contents of the second shift register for the different satellites of said plurality, and if the comparison is successful for an identified satellite ($i_0$), synchronizing the receiver with said identified satellite ($i_0$) at the determined time (q).

2. The method of acquiring the satellite signal according to claim 1, wherein if the estimated content of the second shift register does not correspond to any of said possible contents, the determined time (q) is incremented by one chip and steps (a) to (d) are iterated.

3. The method of acquiring the satellite signal according to claim 1, wherein the content of the second shift register is estimated by taking hard decisions on the first r decoded values ($\tilde{Y}_i^q(k)$) provided by the iterative message passing decoding, where r is a number of positions in the first and second shift registers.

4. The method of acquiring the satellite signal according to claim 3, wherein the iterative message passing decoding in step (c) uses a parity matrix:

$$H = \begin{bmatrix} g_r & \cdots & g_0 & 0 & \cdots & \cdots & 0 \\ 0 & g_r & \cdots & g_0 & 0 & \cdots & 0 \\ \vdots & \ddots & \ddots & \ddots & \ddots & \ddots & \vdots \\ 0 & \cdots & 0 & g_r & \cdots & g_0 & 0 \\ 0 & \cdots & \cdots & 0 & g_r & \cdots & g_0 \end{bmatrix}$$

in which $g_r=1$ and $g_0, \ldots, g_{r-1}$ are the coefficients of the polynomial generating the second M-sequence.

5. The method of acquiring the satellite signal according to claim 1, wherein the second M-sequence being obtained by summating the contents in two positions $\alpha_i$, $\beta_i$ of the second shift register, where i is an index identifying the satellite among said plurality of satellites, the possible contents of the second shift register for the different satellites are given by vectors:

$$A_i^{init} = (G_y^{\alpha_i} + G_y^{\beta_i}) A_y^{init}$$

where $A_y^{init}$ is a vector giving the content of the second shift register at a reference time, and $G_y$ is a state change matrix of the second shift register.

6. The method of acquiring the satellite signal according to claim 1, wherein:

the sequence of second samples ($\tilde{r}_q(k)$, k=0, ..., M−1) is permuted using a permutation relation $\phi(k)=dk+h \mod (N)$ where k is the rank of the sample, d is a decimation factor, h is an offset value and N is the length of the first M-sequence, the permutation being done before step (c);

step (c) provides a sequence of decoded values ($\check{X}_i^q(k)$);

the sequence of decoded values is permuted (650,750) using a permutation relation inverse to said permutation relation to provide a sequence of permuted values ($\check{Y}_i^q(k)$);

the content of the second shift register is estimated by taking hard decisions on a first r values of the sequence of permuted values, where r is the number of positions in the first and second shift registers.

7. The method of acquiring the satellite signal according to claim 6, wherein the iterative message passing decoding in step (c) uses a parity matrix:

$$H = \begin{bmatrix} g_r & \cdots & g_0 & 0 & \cdots & \cdots & 0 \\ 0 & g_r & \cdots & g_0 & 0 & \cdots & 0 \\ \vdots & \ddots & \ddots & \ddots & \ddots & \ddots & \vdots \\ 0 & \cdots & 0 & g_r & \cdots & g_0 & 0 \\ 0 & \cdots & \cdots & 0 & g_r & \cdots & g_0 \end{bmatrix}$$

in which $g_r=1$ and $g_0, \ldots, g_{r-1}$ are coefficients of a polynomial generating the first M-sequence.

8. The method of acquiring the satellite signal according to claim 1, wherein it is checked that the receiver is properly synchronised with said identified satellite by:
(e) multiplying the sequence of said first samples ($r_q(k)$, k=0, ..., M−1), chip by chip, by the second M-sequence associated with said identified satellite to provide a sequence of third samples (($\check{r}_q(k)$, k=0, ..., M−1);
(f) decoding the sequence of third samples using an iterative message passing decoding to provide an estimate of the content of the first shift register at said determined time (q).

9. The method of acquiring the satellite signal according to claim 8, wherein if the content of the first shift register thus estimated does not correspond to the initial content of the first register, the determined time (q) is incremented by one chip and steps (a) to (f) are iterated.

10. The method of acquiring the satellite signal according to claim 9, wherein the content of the first shift register is estimated by taking hard decisions on a first r decoded values ($\check{X}_q(k)$, k=0, ..., r−1) provided by the iterative message passing decoding, where r is a number of positions in the first and second shift registers.

11. The method of acquiring the satellite signal according to claim 8, wherein the iterative message passing decoding in step (f) uses a parity matrix $$H = \begin{bmatrix} g_r & \cdots & g_0 & 0 & \cdots & \cdots & 0 \\ 0 & g_r & \cdots & g_0 & 0 & \cdots & 0 \\ \vdots & \ddots & \ddots & \ddots & \ddots & \ddots & \vdots \\ 0 & \cdots & 0 & g_r & \cdots & g_0 & 0 \\ 0 & \cdots & \cdots & 0 & g_r & \cdots & g_0 \end{bmatrix}$$

in which $g_r=1$ and $g_0, \ldots, g_{r-1}$ are coefficients of a polynomial generating the first M-sequence.

12. The method of acquiring the satellite signal according to claim 8, wherein the iterative message passing decoding in step (c) and the iterative message passing decoding in step (f) both use a "Min-Sum" type algorithm.

13. A receiver for acquiring a satellite signal, said satellite signal being spread by a Gold sequence ($c_i$) at a chip frequency, said Gold sequence being obtained as the sum of a first M-sequence (x) generated using a first shift register and a second M-sequence ($y_i$) generated using a second shift register, said second M-sequence identifying one satellite among a plurality of satellites, the receiver comprising:
circuitry configured to
(a) sample the satellite signal received in base band at the chip frequency starting from a determined time (q) to provide a sequence of first samples ($r_q(k)$, k=0, ..., M−1);
(b) multiply the sequence of said first samples ($r_q(k)$, k=0, ..., M−1), chip by chip, by said first M-sequence (x) to provide a sequence of second samples ($\check{r}_q(k)$, k=0, ..., M−1);
(c) decode the sequence of second samples ($\check{r}_q(k)$, k=0, ..., M−1) using an iterative message passing decoding to supply an estimate of a content of the second shift register at said determined time (q);
(d) compare the estimated content of the second shift register with a plurality of possible contents of the second shift register for the different satellites of said plurality, and if the comparison is successful for an identified satellite ($i_0$), synchronize the receiver with said identified satellite ($i_0$) at the determined time (q).

\* \* \* \* \*